INVENTORS.
CALVIN CALMON
ALLYN H. HEIT

ATTORNEY

United States Patent Office 3,394,068
Patented July 23, 1968

3,394,068
ELECTRODIALYSIS OF PICKLE LIQUOR
USING SEQUESTRANTS
Calvin Calmon, Springfield Township, Burlington County, and Allyn Harold Heit, Mount Holly, N.J., assignors to Ritter Pfaudler Corporation, a corporation of New York
Filed Feb. 12, 1965, Ser. No. 432,273
8 Claims. (Cl. 204—180)

This invention relates generally to a method for electrodialytic separation of mixtures, regeneration of inorganic acids containing metallic ions, and more particularly to a method for regenerating spent pickle liquor and recovering magnetic oxides and hydroxides of iron therefrom.

"Spent pickle liquor" is a conventional trade term used to describe a discarded inorganic acid solution which has been used to dissolve and remove oxide layers (commonly known as "mill scale") from surfaces of iron and steel products or other metals. The pickling process is ordinarily carried out by immersion of the oxide-coated metal in an acid solution at elevated temperatures. The acid concentration of the solution may vary from about 5–50% depending upon the acid used and the metal to be treated. The temperature range is usually about 140–220° F. and is largely governed by economic considerations. The spent acid often contains up to 10% unused free acid as well as up to 23% iron oxides as the ferrous salt of the acid.

Because of the inherently low cost of sulfuric acid, it is the most widely used acid for this process and economic considerations have not forced the development of recovery processes for the spent acid. However, public concern and the resultant legislation have stimulated the development of methods for disposing of spent pickle liquor in ways that do not result in pollution of rivers, lakes, underground water tables and the like. One of the common methods of spent pickle liquor disposal is neutralization with lime which may be followed by either recovery of the iron or "lagooning" the entire slurry. Other "chemical" processes have been developed, all of which claim varying degrees of economic success, but none of which have achieved widespread acceptance because of the cumbersome equipment required and the quantities of treating chemicals consumed.

The appearance in recent years of readily available, chemically stable, and mechanically sturdy permselective ion exchange membranes in the commercial market has resulted in increased interest in electrolytic methods of solving the spent pickle liquor disposal problem. It is the primary object of this invention to provide an electrolytic method for disposal and regeneration of inorganic acids containing metallic impurities with a concurrent elimination of pollution problems.

Permselective membranes offer an efficient method for separating adjacent streams of fluids while allowing certain ions to pass through the membranes under the influence of an electrical potential gradient. These may be either of the anion selective type or cation selective type depending upon the ion exchange material which is used in its preparation. In an ideal system anion selective membranes permit anions (negatively charged ions) to pass through while repelling cations (positively charged ions) and cation selective membranes operate in the opposite manner. Ideal systems, however, have not as yet been developed and leakage of the ion to be repelled occurs to a limited degree across the membrane. It is believed that the leakage is due to osmotic and dialytic transfer processes caused by the concentration differences across the membrane.

It is known that in spent pickle liquor electrolytic recovery systems, anion permselective membranes result in a higher rate of acid production at a reasonable power efficiency than cation permselective membranes. Electrolytic cells have been operated that incorporate anion permselective membranes to separate and define the cell chambers. These cells have used the spent pickle liquor as the catholyte and either fresh sulfuric acid or pickle liquor that has passed through the cathode chamber as the anolyte. Some cells have been built with central chambers which use pickle liquor that has been passed through the cathode chamber into the central chamber and continues, in series, into the anode chamber. Generally, the membranes used in these systems have been of the anion permselective type. In all cases, iron has been deposited on the cathode.

These systems suffer from several major deficiencies, which in the main, have prevented their commercial acceptance. Among them is the inability to deposit iron on the cathode until the acid concentration in that chamber has been materially reduced. Reported values of maximum acid concentrations in which iron will deposit as the metal on the electrode vary between about .7% and .2% acid concentration. Another deficiency is that the cathode chamber effluent contains as much as 5% of ferrous sulfate. Due to economic limitations, a further reduction of this figure cannot be accomplished. It is accordingly another object of this invention to provide an electrodialytic regeneration method wherein iron moieties may be recovered at relatively high acid concentrations and wherein the catholyte is alkaline rather than acidic, thereby eliminating the formation of ferrous sulfate.

The prior art processes suffer from an additional liability in that the recovered iron is in the form of a metal deposited on the cathode electrode. This requires a periodic change of the cathode electrode and a method for reclaiming the metal. Therefore, a further object of this invention is to provide a method for recovering substantially all the iron in a form other than a metallic deposit on the cathode.

In classical electrodialytic systems which employ an alkaline solution in the cathode chamber and acid in the anode chamber, immediate membrane fouling occurs when iron is present. This fouling is caused by the precipitation of ferrous hydroxide in the chamber adjacent to the cathode chamber and the subsequent entrapment of the precipitate in the pores of the membranes. The precipitation is initiated by the increase in pH values due to the migration of hydroxyl ions from the alkaline solution in the cathode chamber across the membrane into the iron-ion containing acidic chamber. The resultant fouled membrane prevents further operation of the electrolytic cell. It has been shown that such fouling starts immediately and progresses until no more current flows across the system. A further object of this invention is to provide an electrodialytic process in which insoluble compounds in general, and iron oxides or hydroxides in particular, will not foul permselective membranes adjacent to alkaline containing chambers.

Another object is to recover regenerated acid of a high order of purity. A further object of this invention is to recover the metal dissolved in the acid in the form of its oxides. A still further object of this invention is to recover iron in the form of its magnetic oxides. It is yet another object of this invention to recover the metallic oxide as a free precipitate. Other objects will become evident to those skilled in the art from a reading of this specification and the appended claims.

We have found that the above objects are achieved by employing an electrodialysis process utilizing an electrodialytic cell having separate chambers defined by selective ion exchange membranes. These chambers comprise an alkaline catholyte chamber with a suitable cationic sequestrant; an acidic anolyte chamber, and a central chamber containing the metal-contaminated acid.

The embodiment disclosed herein is described with respect to the regeneration of spent pickle liquor and the recovery of iron values therefrom, however the inventive concept is applicable to other systems such as chromic acid, phosphoric acid, nitric-chromic acid, phosphoric-chromic acid, and so forth.

Our invention proposes to overcome the prior art problems of membrane fouling and metal recovery by providing a three-chambered cell wherein, the catholyte, anolyte, and material to be purified are contained in separate chambers with no provision for transfer between said chambers except by ionic migration through the permeable membranes, and in addition, supplying a sequestrant within the catholyte.

Although prior art methods using three-chambered cells have been proposed, in these cases generally impure acid passes in series through the cathode chamber, a central chamber and finally into an anode chamber and in all cases iron is deposited upon a cathode. In contrast our method specifically prevents a series passage of impure acid, and substitutes therefore the independent parallel passage of the electrolytes and the impure product.

It has previously been proposed to employ alkaline catholyte, however in any system including materials characterized by insolubility or low solubility in aqueous media of high pH (such as iron salts) the use of an alkaline catholyte has been impractical because of the rapid blinding of the membrane by precipitated hydroxides.

Our invention permits for the first time the use of an alkaline catholyte without precipitation of insoluble hydroxides in adjacent membranes. This is accomplished by the addition of sequestrant, specific for the precipitating cation, to the alkaline solution.

A complete understanding of the invention may be obtained from the following description and explanation which refer to the accompanying drawings illustrating an embodiment for spent pickle liquor regeneration.

Figure 1:
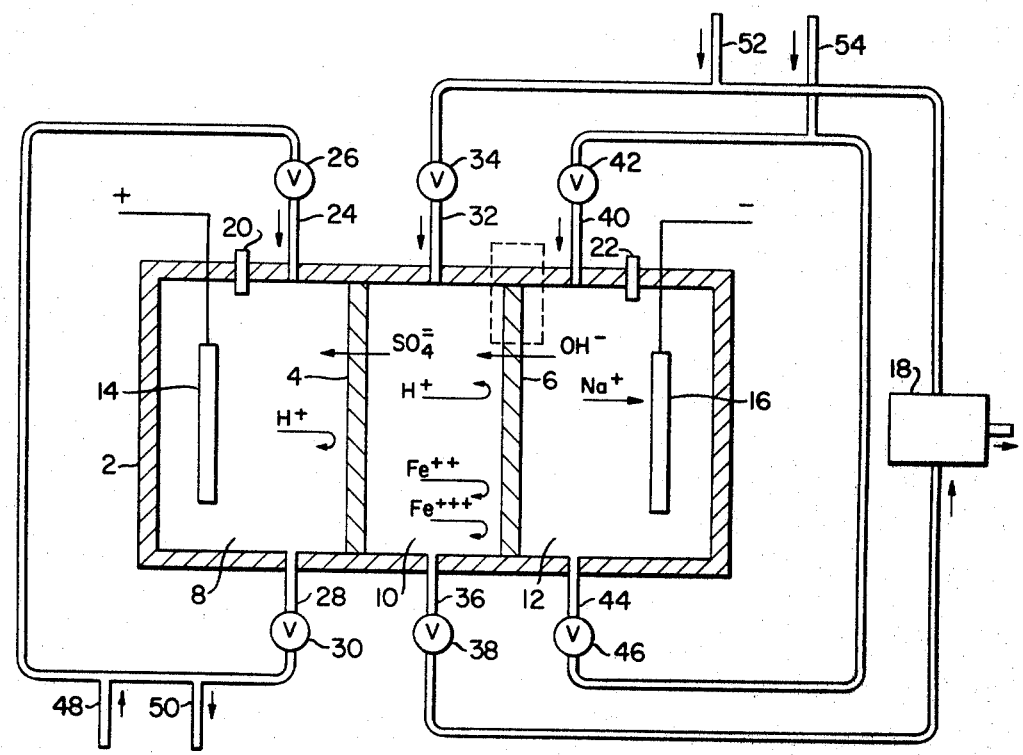
FIG. 1 is a diagrammatic cross-sectional representation of a cell designed according to the invention.

Referring to FIG. 1, a conventional acid-and-alkali-resistant vessel 2 is provided. Within vessel 2 are anion permselective membranes 4 and 6 that divide vessel 2 into three chambers 8, 10 and 12. Chamber 8 is an anode chamber by virtue of anode 14 positioned therein. Chamber 12 is a cathode chamber by virtue of cathode 16 positioned therein. Central chamber 10 is intermediate anode chamber 8 and cathode chamber 12. Anode 14 and cathode 16 are connected to a suitable source of direct current (not shown). A solids removal device 18 is schematically shown. Vents 20 and 22 are provided for the escape of gases generated in chambers 8 and 12 respectively.

Line 24 with a valve 26 and line 28 with a valve 30 are used for the circulation of anolyte within chamber 8. Line 32 with valve 34 and line 36 with valve 38 are used for the circulation of material within central chamber 10 and said lines are operatively connected with solids-removal device 18. Line 40 with valve 42, and line 44 with valve 46 are provided for the circulation of catholyte within chamber 12. Line 54 is provided for the addition of catholyte and lines 48 and 50 are inlet and outlet means for the addition or removal of anolyte. Line 52 provides an inlet within central chamber 10 for raw material.

In the operation of the above described apparatus in accordance with the present invention for the regeneration of spent pickle liquor, said liquor is placed in chamber 10, while an aqueous solution of sulfuric acid is placed within the anode chamber 8 and an aqueous solution of an electrolyte, preferably an alkali hydroxide, is placed within cathode chamber 12. A direct current of electricity is passed through the cell by means of anode 14 and cathode 16, thus causing cations and anions formed within the cells to migrate toward the cathode and anode respectively.

Within anode chamber 8, which contains dilute sulfuric acid, hydrogen ions formed, which are migrating towards cathode 16 meet anion selective membrane 4 and are repelled thereby.

Within central chamber 10, which contains spent pickle liquor, iron cations, hydrogen cations and sulfate anions are formed. The sulfate anions migrate toward anode 14 and since membrane 4 is anion-selective they pass through said barrier into chamber 8, thereby increasing the overall concentration of sulfate ions within said chamber. However, hydrogen and iron cations released within chamber 10 in their attempts to migrate toward cathode 16 are met by anion-selective barrier 6, which repels the cations and substantially confines them to chamber 10.

Within cathode chamber 12 the alkali hydroxide, e.g. sodium hydroxide, ionizes to form hydroxyl anions and sodium cations. The sodium cation migrate toward cathode 16 and the hydroxyl anions toward anode 14. When the hydroxyl anions meet membrane 6, because it is anion-selective, they pass through into chamber 10.

The net effect of the natural ionic migration coupled with the anion-selective barrier between chambers 10 and 12, is the meeting of the iron cations and hydroxyl anions within chamber 10, whereupon iron hydroxides are formed and are precipitated within said chamber. The precipitated solids along with the circulating solution are then carried by way of line 36 to solids-removal device 18 and recovered as iron hydroxide which is easily converted to iron metal.

In an ideal system the hydrogen and iron cations would be completely barred from passing into cathode chamber 12; however, the non-ideal nature of presently available selective membranes permits a small amount of cations to pass into and through even anion-selective membranes. In the instant case this means that, absent some precaution, iron cations will pass into membrane 6 and meet hydroxyl anions traveling in the opposite direction, thus causing precipitation of iron hydroxide within the interstices of said membrane and subsequent fouling. Accordingly, we provide, as a necessary and vital aspect of our invention, a cationic sequestering agent within chamber 12 that is specific for iron cations. The presence of this sequestrant prevents precipitation within the body of the anion-selective membrane and within the cathode chamber 12. The membrane pores are not blocked with precipitate, and hydroxyl ions continuously pass into the central chamber without the regeneration operation that would be necessary in the absence of said sequestering agent.

Figure 2:
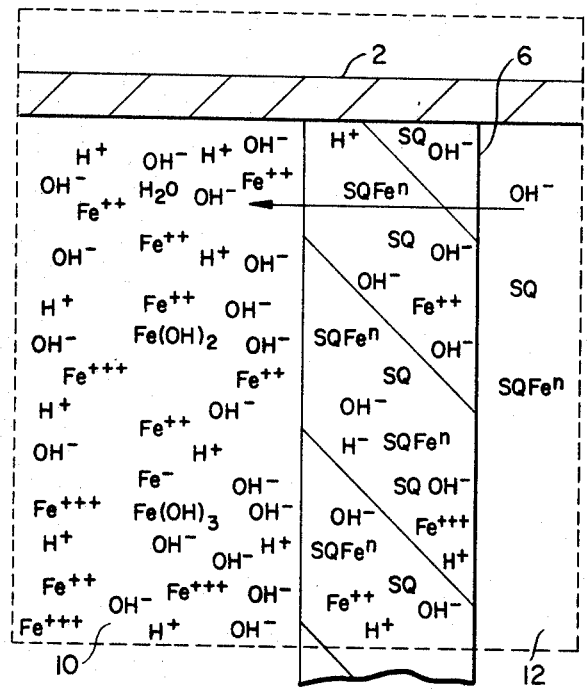
FIG. 2 is an enlarged, fragmentary representation of the dotted section in FIG. 1.

Referring to FIG. 2, the iron sequestrant (represented as SQ) is circulated within chamber 12 and a portion passes into anion-selective membrane 6 and ties up any iron penetrating said membrane. The concentration of hydroxyl ion within chamber 10 is greatest in the immediate vicinity of membrane 6.

A reaction takes place immediately between the migrating hydroxyl ions and the hydrogen ions, ferrous ions and the ferric ions of the pickle liquor solution within chamber 10. The iron containing products of this reaction are ferrous and ferric hydroxide which are insoluble in the alkaline zone, created by the high concentration of hydroxyl ions, and precipitate from the solution. As the precipitate is carried back into the main stream of spent pickle liquor which is circulated through central chamber 10, line 36 and solids removal unit 18, the precipitate will remain substantially insoluble in the main spent pickle liquor stream as long as the acid concentration remains below about 15 grams/liter. Solids removal unit 18 removes this iron percipitate from the system. Surprisingly, we have found that the iron so removed from the system is magnetic, thereby increasing the commercial value of this invention.

Some iron-sequestrant complexed molecules will escape from anion selective membrane 6 into cathode chamber 12. These molecules will remain in the cathodic system until they either re-enter anion permeable membrane 6 or are regenerated at cathode 16 by plating iron on the cathode and producing iron-free sequestrant molecules.

The following summation reactions are believed to take place at the electrodes:

(1) Cathode reaction:

$$H_2O + e^- \rightarrow OH^- + \tfrac{1}{2}H_2$$

(2) Anode reaction:

$$H_2O \rightarrow 2H^+ + \tfrac{1}{2}O_2 + 2e^-$$

adding, $$2H_2O \rightarrow OH^- + 2H^+ + \tfrac{1}{2}H_2 + \tfrac{1}{2}O_2 + e^-$$

The following specific examples are provided to further illustrate the practice of our invention.

EXAMPLE I

A three-chambered electrodialytic cell was formed by placing two anion permeable membranes between three circular polyethylene rings, each about 1.3 cm. thick and defining an area of approximately 25 square centimeters. The membranes used were those sold by the Ionac Chemical Company of Birmingham, N.J., and designated as Ionac MA-3236. They were heterogeneous in nature and constructed on a webbing of inactive supporting fibers. The two membranes, placed between the polyethylene rings, together with electrodes that formed the end walls, defined the chambers. The anode was formed from a lead alloy comprising about 1% silver and the cathode was formed from a mild steel. Current leads from suitable sources were attached to the electrodes. The circulating fluids were carried in Neoprene (trademark of E. I. du Pont de Nemours and Company) tubing.

The catholyte comprised a 5% NaOH solution. To this solution was added triethanol amine, a sequestrant specific for iron cations. The anolyte comprised 61.5 g. of $H_2SO_4$ (5% $H_2SO_4$).

Ten grams of $H_2SO_4$ in a 1% solution and 85% grams of $FeSO_4$ were placed in the middle chamber. Current was passed through the cell at a current density of 150–200 amps/sq. ft. After 10.4 hours of continuous operation no fouling of the anion membrane adjacent to the cathode chamber had occurred. Furthermore, the $H_2SO_4$ content of the anode chamber had increased from 61.5 grams to 90.6 grams. In addition 15.1 grams of magnetic iron precipitate calculated as $Fe_3O_4$ was recovered on a filter plate placed in the central chamber circulation line. The measured average current was 1.75 amps. Current efficiency calculated as the ratio of actual acid transferred to the theoretical Coulomb's law amount was 79%. The measured temperature was 35–40° C.

EXAMPLE II

The process of Example I was carried out with reactants and conditions similar to those in Example I in all respects except that the triethanol amine sequestering agent was removed. Fouling of the membrane adjacent to the cathode took place almost immediately, i.e. 0.03 hour.

EXAMPLE III

In a cell similar to that described in Example I, 46.7 grams of $H_2SO_4$ in addition to an arbitrary amount of $FeSO_4$ simulative of a known pickle liquor composition was placed within the central chamber and 52.2 grams of $H_2SO_4$ within the anode chamber. 40 parts triethanol amine per 100 parts of NaOH was provided in the cathode chamber. Over a 1 hour period the average current was 3 amperes and current efficiency was calculated to be 41%.

After 1 hour, 44.7 grams of $H_2SO_4$ were found in the cenral chamber and 54.4 grams within the anode chamber, no iron was precipitated. This example indicates the dependency of the iron hydroxide precipitation within the central chamber upon the acid concentration therein. Further, the average temperature during said operation was 15–20° C., in contrast to the 35–40° C. measured in Example I. This indicates that temperature and current efficiency are related.

The only consumable materials in the process are electricity and water. The make-up water is added to the system as a component of the spent pickle liquor as well as by entrance streams directly into the anode circulating system.

The iron hydroxide, which is removed by means of a suitable solids removal unit from the system representing this embodiment of the invention, is magnetic; it has the empirical formula $Fe_3O_4 \cdot XH_2O$.

The sulfate ion, which migrates from central chamber 10 through ion permeable membrane 4 into anode chamber 8 combines with the hydrogen ion formed at the anode reaction to produce sulfuric acid.

The anion-permeable membrane 6 additionally acts as a barrier to prevent physical contact and inter-mixing of the streams. The sequestrant circulating in the cathode chamber tends to migrate, to a limited extent, into the anion membrane adjacent to that chamber. The anionic properties of the membrane however, prevent appreciable amounts of the sequestrant from passing through it.

Iron hydroxide therefore, does not precipitate in the anion membrane nor does whatever small amount that enters the cathode chamber so precipitate, but is reduced to iron metal at the cathode leaving the sequestrant free for further use. Thus, the catholyte system is in effect self-regenerating.

The anode chamber, for the most efficient operation, should be defined by the walls of the cell and an anion permselective membrane, although a non-selective membrane is effective. An anion permselective membrane will permit migration of sulfate ion from the spent pickle liquor solution of the central chamber into the anode chamber, but will substantially prevent migration of hydrogen ion from the anode chamber into the central chamber. This results in a more rapid build-up of acid concentration in the anode chamber than would be the case if a non-selective membrane were used, and additionally it facilitates a reduction of the acid concentration within the central chamber to values at which iron oxides will be precipitated from the solution.

The process of this invention can be carried out in either batch or continuous operations. In the case of a batch operation, the process is continued until the resistance through the cell makes it economically unfeasable to continue. In the case of a continuous operation, the rates of the entrance and exit streams of regenerated acid, water, and spent pickle liquor must be balanced to maintain the acid concentration in the central chamber within the desired limits. In either method of operation, the metallic oxides and hydroxides are removed from the system by means of a suitable solids removal unit.

Temperature is not a primary consideration in the operation of this process although there is a greater current efficiency when operating at higher temperatures. The cell will operate over the range of temperatures normally encountered in a pickling operation, i.e., ambient up to 220° F. and above in the event super-atmospheric pressures are desired. As the process continues, the electrical energy used to overcome the resistance of the cell will be converted into thermal energy and will cause the overall cell temperature to rise. This inherent characteristic of the cell may require cooling devices depending upon the characteristics of the membranes, and the cell material. Further, cooling may be required to prevent the various solutions from boiling.

Electrodes, well known in the art may be employed in this process. The only restriction upon the electrode used is its susceptibility to attack by the electrolyte of the chamber. Acid and oxidation resistant materials are recommended for use in the anode chamber such as noble metals, lead, lead alloys and the like. The cathode should be resistant to attack by alkalies and may be formed from materials such as mild steel and the like. Materials for electrodes in an acid-alkali electrodialytic cell are well known in the art.

The current densities in the operation of this invention may be varied as desired. It is recommended, however, that the current density be between about 20 and 250 amperes per square foot of area of mebrane and preferably between 100 and 185 amperes per square foot for efficient operation. However, it should be noted that the operation of this invention is not limited by the current densities, but rather by the availability of heat removing facilities available to cool the system when high current densities are employed.

The term sequestering agent as used herein means a group or groups which will combine with a metal ion and render that ion "inactivated" in the solution so that it no longer exhibits normal reactions in the presence of precipitating agents. When more than one group combines with the metal ion, the groups may be attached to each other as well as to the metal ion. The distinction between these two types of entities has been recognized in the art. Inactivating groups that are not attached to each other are known as complexing agents. Inactivating groups that are attached to themselves as well as to the metal are known as chelating compounds. For the purpose of this invention either a complexing agent or a chelating compound may be used and the terms are used interchangeably without intent to distinguish between them.

Sequestering agents that are useful for our invention must be water-soluble, and must result in a water-soluble complex with the metal ion. Further, the sequestrant must be of the cationic type and it should be resistant to cathodic reduction. By a cationic type sequestering agent we mean a substance whose prevailing charge is positive and is attracted to the cathode when an electric potential is applied between two electrodes immersed in an electrolyte. Since the sequestering agent is to be circulated in the alkaline chamber of the electrodialytic cell it must be functional at pH values above 5 and preferably between 11 and 14. In addition, it must be functional at the operating temperature of the cell. The quantities of sequestering agent used in the catholyte are between 1 and 100 parts per 100 parts of 100% strongly basic, water-soluble hydroxide or its equivalent salt, having anions compatible with the anions of the acid to be regenerated, and preferably between 10 and 80 parts.

In the described embodiment of the invention, which is concerned with ferrous and ferric ion sequestration, the sequestrant used for that system should be suitable for both ion forms of iron. It is, of course, possible to use two sequestrants, each specific for a particular type of ion. The variations in the amount of sequestering agent used will be a function of, among other parameters, its capacity for sequestering the metal ion in question, the concentration of that ion, interference from other ions, and so forth.

The following are examples of sequestrants useful in the pickle liquor system. N-2 hydroxyethylethylene diamine; 2-(2 hydroxypropylamine) ethylamine; diethylene triamine; B,B',B'' triaminotriethyleneamine; triethylene tetramine; tetrapis (2-aminoethyl)-ethylendiamine; triethanolamine; diethylene triamine. It has been found that triethanol amine is the preferred sequestrant due to its ability to sequester both ferric and ferrous ion.

As an example of other process uses in addition to regeneration of sulfuric acid from spent pickle liquors, this invention would have application in a system comprised of dilute chromic acid in anode chamber 8, spent chromic acid (containing chromic, hydrogen, aluminum, and magnesium ion among others) in central chamber 10 and an alkaline solution with a cationic sequestrant specific for aluminum and a cationic sequestrant specific for magnesium in cathode chamber 12. Upon passage of a direct electric current the analog of the sulfuric acid system would take place; chromic acid would concentrate in anode chamber 8, hydrous alumina and hydrous magnesium oxide would precipitate in central chamber 10 (by control of the pH; the metal oxides can be separated from each other) both oxides being removed by a suitable solids removal unit and the sequestrant in cathode chamber 12 would prevent fouling of anion membrane 6 while continually regenerating itself. A chromate system as described above is common to the aircraft industry where chromic acid is used to anodize the aircraft metals. The disposal problem and cost of chromic acid make it virtually prohibitive not to regenerate the chromic acid.

It is within the scope of this invention to use any configuration and number of chambers that will result in the operation of an electrodialytic cell in accordance with the principles disclosed in this specification. The essential characteristics of the invention as applied to the regeneration of mixtures of inorganic acids and metallic ions are a multi-chambered electrodialytic cell, physically divided by ion permeable membranes as herein described; independent streams circulated through the chambers, (the central stream containing metallic ions in an acid medium, the catholyte comprising an alkaline electrolytic solution and a sequestering agent, and the anolyte comprising an acid solution); whereby the metal is precipitated in the central chamber as a hydroxide or oxide and as such is removed from the system.

Further, the broad concept of electrodialytic purification by causing ions that will form insoluble compounds to migrate through a selective membrane, in combination with the provision of a sequestering agent to prevent membrane fouling is applicable in areas other than those specifically disclosed herein. The application of this concept and the selection of components and process conditions may be made by those skilled in the art of electrodialysis without departure from the inventive concept.

The terms anion-selective membrane and anion permselective membrane, and anion permeable membranes are to be construed as equivalent for the purposes of this invention and said terms define membranes that permit anions to pass through and repel cations. The term nonselective membrane defines a membrane that does not exhibit a significant preference for the passage of cations or anions.

It can thus be seen that this invention achieves the stated objects in providing an economical method for regenerating acid solutions containing metal impurities. Further, said invention provides a method for continuously processing said material and makes possible recovering the metals as precipitates, yet eliminates the membrane fouling common to the prior art methods. In additions, said process is operable at acid concentrations much higher than the 5 N lower limit of prior art practices and operates with an alkaline catholyte that eliminates formation of reaction compounds of the metal cation and acid anion within the cathode chamber.

It is to be understood that the embodiment shown is prefered, but is intended to be illustrative rather than limiting. Various modifications and changes may be made therein particularly in the form and relation of parts without departing from the spirit or scope of my invention as set forth in the appended claims.

We claim:
1. In an electrodialytic process for separating a mixture of dializable ions the process comprising the following steps:
   (a) confining said mixture between spaced ion permeable membranes, at least one of said membranes being a permselective membrane;
   (b) providing on the opposite side of the permselective membrane a first electrolyte containing ions that will form substantially insoluble products with ions within said mixture;
(c) providing a second electrolyte on the opposite side of the other membrane;
(d) supplying a sequestrant to said first electrolyte that will substantially prevent the formation of insoluble compounds within the matrix of the permselective membrane;
(e) passing a direct current through said electrolytes and said mixture;
whereby ions from said first electrolyte will migrate through said permselective membrane to form separable insoluble products with ions confined between said spaced membranes.

2. An electrodialytic process for recovering acid from a mixture of said acid and metallic ions comprising the following steps:
(a) confining said mixture of acid and metallic ions between spaced ion permeable membranes, at least one of said membranes being an anion selective membrane;
(b) providing on the opposite side of said anion selective membrane a catholyte containing anions that will form substantially insoluble products with said metallic ions, and a cationic sequestrant for said metallic ions;
(c) providing on the opposite side of the other membrane an anolyte capable of producing hydrogen ions;
(d) passing a direct current through said anolyte, catholyte and acid mixture;
whereby anions from said mixture will migrate into said anolyte to regenerate said acid and anions from said catholyte will migrate into said mixture to form insoluble products with the metallic ions contained therein.

3. A process according to claim 2, wherein a cationic sequestrant for said metallic ions is included within said catholyte.

4. A process according to claim 2 wherein said acid is selected from the group consisting of sulfuric, nitric, chromic, phosphoric and combinations thereof.

5. A process according to claim 2 wherein said acid is chromic acid and said metallic ions are members of the group consisting of aluminum ions, magnesium ions and mixtures thereof.

6. The process of claim 2 wherein said catholyte includes an effective amount of a cationic sequestrant for iron ions.

7. The process of claim 6, wherein said cationic sequestrant is selected from the group consisting of N-2 hydroxyethylethylene diamine; 2-( 2 hydroxypropylamine) ethylamine; diethylene triamine; B, B', B'' triaminotriethyleneamine; triethylene tetramine; tetrapis (2-aminoethyl)-ethylendiamine; triethanolamine; and diethylene triamine.

8. The process of claim 6, wherein said cationic sequestrant is triethanol amine.

References Cited
UNITED STATES PATENTS

| | | | |
|---|---|---|---|
| 2,810,686 | 10/1957 | Bodamer et al. | 204—301 |
| 3,124,520 | 3/1964 | Juda | 204—86 |

JOHN H. MACK, *Primary Examiner.*

A. C. PRESCOTT *Assistant Examiner.*